(12) United States Patent
Liu et al.

(10) Patent No.: US 7,915,858 B2
(45) Date of Patent: Mar. 29, 2011

(54) LOCALIZED CHARGING, LOAD IDENTIFICATION AND BI-DIRECTIONAL COMMUNICATION METHODS FOR A PLANAR INDUCTIVE BATTERY CHARGING SYSTEM

(75) Inventors: Xun Liu, Guizhou (CN); Wing Choi Ho, Hong Kong (HK); Ron Shu Yuen Hui, Hong Kong (HK); Wing Cheong Chan, Hong Kong (HK)

(73) Assignee: City University of Hong Kong, Kowloon (HK)

( * ) Notice: Subject to any disclaimer, the term of this patent is extended or adjusted under 35 U.S.C. 154(b) by 585 days.

(21) Appl. No.: 11/929,466

(22) Filed: Oct. 30, 2007

(65) Prior Publication Data

US 2009/0108805 A1    Apr. 30, 2009

(51) Int. Cl.
*H01M 10/46* (2006.01)
(52) U.S. Cl. ....................................................... 320/108
(58) Field of Classification Search .................. 320/107, 320/108, 112, 114, 115, 116
See application file for complete search history.

(56) References Cited

U.S. PATENT DOCUMENTS

| | | | | |
|---|---|---|---|---|
| 6,118,249 | A | 9/2000 | Brockmann et al. | 320/108 |
| 6,301,128 | B1 | 10/2001 | Jang et al. | 363/17 |
| 6,356,049 | B2 | 3/2002 | Oguri | 320/101 |
| 6,501,364 | B1 | 12/2002 | Hui et al. | 336/200 |
| 7,164,255 | B2 * | 1/2007 | Hui | 320/108 |
| 2003/0210106 | A1 | 11/2003 | Cheng et al. | 333/24 R |
| 2009/0121675 | A1 * | 5/2009 | Ho et al. | 320/108 |

FOREIGN PATENT DOCUMENTS

| | | | |
|---|---|---|---|
| GB | 2 388 716 | A | 11/2003 |
| GB | 2 389 720 | A | 12/2003 |
| GB | 2 389 767 | A | 12/2003 |
| GB | 2 392 024 | A | 2/2004 |
| GB | 2 398 176 | A | 8/2004 |
| GB | 2 399 225 | A | 9/2004 |
| GB | 2 399 230 | A | 9/2004 |
| GB | 2 399 446 | A | 9/2004 |
| WO | WO 03/105308 | A1 | 12/2003 |
| WO | WO 2004/038888 | A2 | 5/2004 |
| WO | WO 2007/019806 | A1 | 2/2007 |

OTHER PUBLICATIONS

Chang-Gyun Kim; Dong-Hyun Seo; Jung-Sik You; Jong-Hu Park; Cho, B.H., "Design of a contactless battery charger for cellular phone," IEEE Transactions on Industrial Electronics, vol. 48, Issue 6, Dec. 2001, pp. 1238-1247.

S. C. Tang, S. Y. R. Hui and H. Chung, "Evaluation of the Shielding Effects on Printed-Circuit-Board Transformers using Ferrite Plates and Copper Sheets," IEEE Transactions on Power Electronics, vol. 17, No. 6, Nov. 2002, pp. 1080-1088.

(Continued)

*Primary Examiner* — Edward Tso
(74) *Attorney, Agent, or Firm* — Heslin Rothenberg Farley & Mesiti P.C.

(57) ABSTRACT

Methods and principles are described for systematizing localized charging, load identification and bi-directional communication in a planar battery charging system. Also described is control circuitry for selectively energizing a primary winding when a load is placed on the platform. The optimization of the size of the receiver winding compared to the transmitter winding is discussed, while the associated communication methods include techniques for load identification, compatibility checks, hand-shaking and communication of charging status.

25 Claims, 7 Drawing Sheets

OTHER PUBLICATIONS

S. Y. R. Hui and W. C. Ho, "A New Generation of Universal Contactless Battery Charging Platform for Portable Consumer Electronic Equipment," IEEE Power Electronics Specialists Conference, 2004, vol. 1, Jun. 20-25, 2004, pp. 638-644.

T. Sekitani, M. Takamiya, Y. Noguchi, S. Nakano, Y. Kato, K. Hizu, H. Kawaguchi, T. Sakurai, T. Someya, "A large-area flexible wireless power transmission sheet using printed plastic MEMS switches and organic field-effect transistors," IEDM 2006, International Electron Devices Meeting, Dec. 2006, pp. 1-4.

* cited by examiner

LOCALIZED CHARGING, LOAD IDENTIFICATION AND BI-DIRECTIONAL COMMUNICATION METHODS FOR A PLANAR INDUCTIVE BATTERY CHARGING SYSTEM

FIELD OF THE INVENTION

This invention relates to localized charging, load identification and bi-directional communication methods for use in a planar battery charging system.

BACKGROUND OF THE INVENTION

The increasing popularity of portable consumer electronic products such as mobile phones, MP3 players and PDAs has prompted new concerns on the huge variety and number of battery chargers that are required. This number is both inconvenient to users and eventually leads to electronic waste problems. Inductive or wireless charging apparatus that can charge more than one electronic product have been proposed. Two different approaches have been proposed for the ac magnetic flux generation, namely "horizontal flux" and "vertical flux" method.

Inductive electronic chargers have been developed for use with some types of portable electronic equipment such as electric toothbrushes. Inductive chargers have also been proposed in U.S. Pat. Nos. 6,356,049, 6,301,128, and 6,118,249. These inductive type chargers, however, use traditional transformer designs with windings wound around ferrite magnetic cores. The main magnetic flux between the primary (energy-transmitting) winding and secondary (energy-receiving) winding has to go through the magnetic core materials. An alternative contactless charger [Chang-Gyun Kim; Dong-Hyun Seo; Jung-Sik You; Jong-Hu Park; Cho, B. H., "Design of a contactless battery charger for cellular phone," IEEE Transactions on Industrial Electronics, Volume: 48, Issue: 6, December 2001 Page(s): 1238-1247.] proposed also uses magnetic cores as the main structure for the coupled transformer windings. However, these battery chargers do not use a planar structure and each charger is able to charge only one electronic load at a time.

Two different approaches to planar battery charging devices have recently been proposed. The first type of planar battery charger modifies the rotating machine concept by flattening the "round shape" of the motor into a "pancake shape," as shown in FIG. 1(a) and reported in GB2399225A, GB2398176A, WO2004/038888A, GB2388716A, US2003-210106A, GB2392024A, and GB2399230A. The magnetic flux lines 1 flow along (i.e., roughly parallel to) the planar charging surface 2. However, such a horizontal flux approach requires a vertical surface to pick up the ac flux for voltage induction (FIG. 1(b)) and this limitation makes it difficult to design a slim energy-receiving module that can be unobtrusively housed inside the equipment to be charged. Typically, as shown in FIG. 1(b) the secondary winding needs to be wound round a magnetic core 3.

The second approach (shown for example in WO03/105308A, GB2389720A, GB2399446A, U.S. Pat. No. 7,164,255, GB2389767A, WO2007/019806) creates an ac magnetic field with the flux lines 4 flowing substantially vertically out of a planar charging surface 5 (FIG. 2(a)). Since the lines of flux leave the charging surface vertically, the entire surface of the load in principle can be used to pick up the flux [S. C. Tang, S. Y. R. Hui and H. Chung, "Evaluation of the Shielding Effects on Printed-Circuit-Board Transformers using Ferrite Plates and Copper Sheets," IEEE Transactions on Power Electronics, Vol. 17, No. 6, November 2002, pp. 1080-1088; S. C. Tang and S. Y. R. Hui, "Planar printed-circuit-board transformers with effective electromagnetic interference (EMI) shielding" U.S. Pat. No. 6,501,364; S. Y. R. Hui, "Apparatus and method of an inductive battery charger," PCT patent application WO03/105308; S. Y. R. Hui and W. C. Ho, "A New Generation of Universal Contactless Battery Charging Platform for Portable Consumer Electronic Equipment," IEEE Power Electronics Specialists Conference, 2004, Volume: 1 , 20-25 Jun. 2004, Pages: 638-644]. In practice, the area of the battery pack or the back cover of a portable electronic product can be used for the energy-receiving coil. This vertical flux approach makes it easier than the horizontal flux approach to design a slim energy-receiving module. Electro-magnetic shielding 6 is provided on the side of the charging surface opposite from the side on which a device to be charged is placed. This shielding prevents flux from being directed in the wrong direction (which would be a safety issue—especially if the battery charging platform was placed on a metal surface) and enhances the magnetic flux that is available for battery charging. Electromagnetic shielding is also added on the side of the energy-receiving coil opposite from the side to be placed on the charging surface as shown for example in FIG. 2(b). In such a battery charging platform a secondary winding is provided that is associated with a battery to be charged. The secondary winding picks up the magnetic flux and generates a charging voltage that is provided to the battery. Generally the secondary winding would be formed integrally with the battery such that a battery or a device containing the battery is placed on the charging surface with the secondary coil parallel to the surface such that it receives a maximum amount of magnetic flux. Alternatively, however, the secondary winding may be electrically connected to the battery but physically separate therefrom. In such a case the secondary winding may be formed as part of a secondary charging module that is placed on the charging surface. This possibility is particularly useful to allow the charging platform to be used with older electronic devices that are not otherwise designed for use with such a platform.

In both cases, the entire surface of the charging surface is energized for energy transfer. Although the concept of a "localized charging principle" has been disclosed previously in GB2389720A, U.S. Pat. No. 7,1642,55 and WO2007/019806, so far there is no systematic approach in designing an inductive battery charging pad that can meet the energy-efficiency, safety, electromagnetic compatibility requirements simultaneously. In "T. Sekitani, M. Takamiya, Y. Noguchi, S. Nakano, Y. Kato, K. Hizu, H. Kawaguchi, T. Sakurai, T. Someya, "A large-area flexible wireless power transmission sheet using printed plastic MEMS switches and organic field-effect transistors," IEDM '06, International Electron Devices Meeting, December 2006, pp. 1-4," a MEMS method has been proposed for inductive charging system, but such approach is restricted to relatively low-power and is very costly.

SUMMARY OF THE INVENTION

According to the present invention there is provided, in a first aspect, a planar battery charging system comprising a primary power transmission side formed of an array of primary windings adapted to generate magnetic flux substantially perpendicular to a charging surface, and a secondary power receiving side comprising a secondary winding associated with a battery to be charged and being adapted to receive the magnetic flux when placed on the charging surface, the secondary winding being provided with electromagnetic shielding on the side of the winding opposite from the side to be placed on the charging surface. The relative dimensions of the primary windings and the secondary winding are chosen to meet the conditions that (a) the area enclosed by the secondary winding is greater than the area enclosed by a primary winding, (b) the secondary winding or the shielding will always fully enclose a primary winding when a secondary winding is placed on the charging surface, and (c) a single primary winding generates sufficient power to charge a the battery.

Preferably, in order to optimize the performance of the battery charging system, the ratio of the area enclosed by the secondary winding to the area enclosed by a primary winding is minimized while being consistent with conditions (a) and (b).

In preferred embodiments of the invention, the primary windings are arranged in a regular array of identical size and shape. The array of primary windings may also be divided into a plurality of zones and within each zone the primary windings are of identical size and shape, though different zones may feature windings of different sizes and shapes.

In some embodiments of the invention, the primary windings are provided in a stacked structure which may, for example, be formed of two or more connected coils separated by a substrate.

Preferably, only a single primary winding is excited when a secondary winding is placed on the charging surface.

In embodiments of the invention, the electromagnetic shielding provided with the secondary winding extends beyond the dimensions of the secondary winding. Preferably, only a primary winding that is covered either by the secondary winding, or by the electromagnetic shielding, when a secondary winding is placed on the charging surface is excited. More than one primary winding may be excited, provided that only primary windings covered by the secondary winding and/or shielding are excited.

According to another aspect of the present invention, there is provided a planar battery charging system comprising a primary power transmission side formed of an array of primary windings adapted to generate magnetic flux substantially perpendicular to a charging surface, and a secondary power receiving side comprising a secondary winding associated with a battery to be charged and being adapted to receive the magnetic flux when placed on the charging surface. When a secondary winding is placed on the charging surface, only a single primary winding is excited to generate magnetic flux to charge the battery.

Preferably, a matrix switching array is provided for enabling a selected primary winding to be excited. When excited, a single primary winding may preferably provide sufficient magnetic flux to charge the battery.

In preferred embodiments of the invention, means are provided to detect the presence and location on the charging surface of the secondary winding.

According to a further aspect of the invention, there is provided a planar battery charging system comprising a primary power transmission side formed of an array of primary windings adapted to generate magnetic flux substantially perpendicular to a charging surface, and a secondary power receiving side comprising a secondary winding associated with a battery to be charged and being adapted to receive the magnetic flux when placed on the charging surface. The planar battery charging system further comprises a matrix switching array for selectively exciting individual primary windings.

In preferred embodiments of the invention, the array of primary windings comprise a plurality of rows and a plurality of columns, wherein the matrix switching array comprises one switch per row and one switch per column, and wherein a winding to be excited is selected by closing the switches in the row and column corresponding to the location of the winding. The switches may be controlled by a microprocessor control unit and the matrix switching array preferably includes filter means to prevent the generation of EMI interference.

According to a still further aspect of the invention, there is provided a planar battery charging system comprising a primary power transmission side formed of an array of primary windings adapted to generate magnetic flux substantially perpendicular to a charging surface, and a secondary power receiving side comprising a secondary winding associated with a battery to be charged and being adapted to receive the magnetic flux when placed on the charging surface. The battery charging system further comprises data communication means for enabling data communication between the primary side and the secondary side.

The data transfer from the primary side to the secondary side may be achieved by modulating the excitation of a primary winding. The data transfer from the secondary side to the primary side may be achieved by modulating a parameter (such as, for example, the loading conditions) on the secondary side.

Preferably, the data communication comprises detection by the primary side of a load to be charged on the secondary side. The detection of a load to be charged may include the detection of the location of the load on the charging surface.

Preferably, the data communication comprises hand-shaking and compatibility checks between the primary side and a load to be charged and/or determination of the charging status of a battery.

BRIEF DESCRIPTION OF THE DRAWINGS

Some embodiments of the invention will now be described by way of example and with reference to the accompanying drawings, in which.

DETAILED DESCRIPTION OF PREFERRED EMBODIMENTS

Preferred embodiments of the present invention provide a systematic methodology that covers a range of technical aspects of an inductive battery charging system. Such a system includes a charging platform or pad that generates vertical flux from the planar surface of the charging pad and at least in preferred embodiments the present invention addresses several basic principles for achieving localized charging in a charging pad system. Although these principles and corresponding techniques can be implemented individually, their collective use is synergistic and enables the development of an inductive charging pad system that can meet various international regulatory requirements.

Figure 1A:
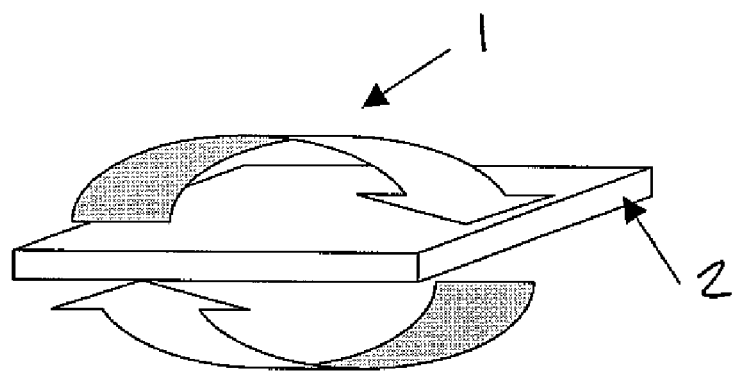
FIGS. 1(a) and (b) show (a) the direction of the flux lines in a first prior art battery charging platform, and (b) a corresponding secondary device, FIGS. 2(a) and (b) show (a) the direction of the flux lines in a second prior art battery charging platform, and (b) a corresponding secondary device.
Figure 1B:
Figure 2A:
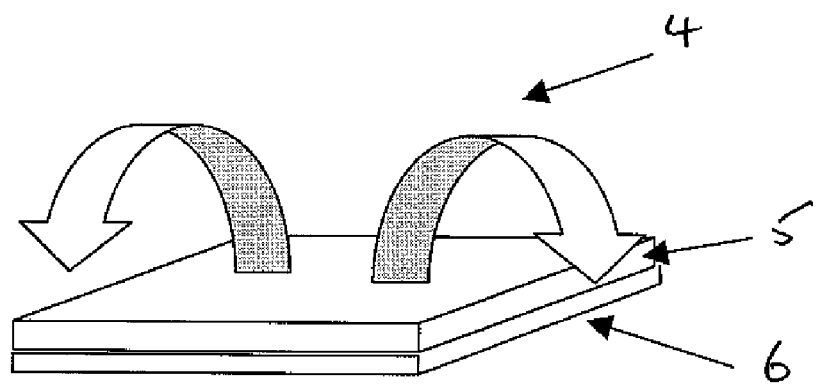
Figure 2B:
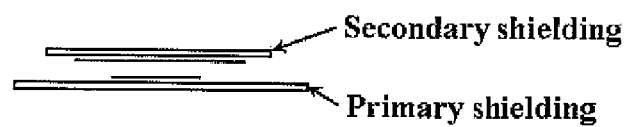
Figure 3:
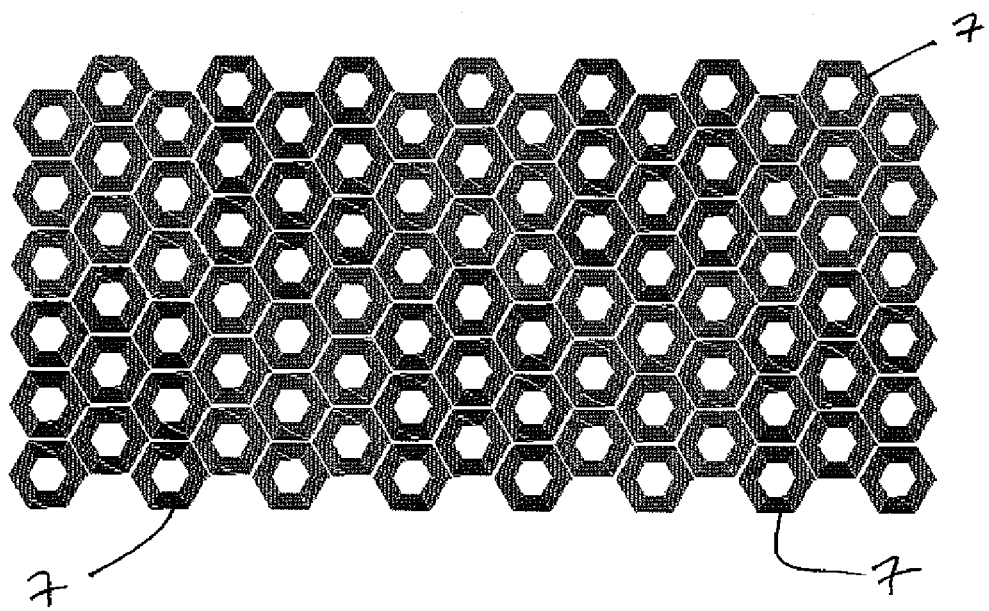
FIG. 3 shows one example of a single- or multiple layer winding array for a charging platform based on hexagonal windings.

FIG. 3 shows a typical single-layer winding array structure with many individual primary energy-transmitting coils 7 (named transmitter windings hereafter) in an inductive battery charging pad. It is also proposed that a multilayer winding array can also be used. For example, a stacked winding where each primary winding comprises a pair of coils provided respectively on two sides of a substrate, such as a printed-circuit board, can be adopted to enhance the magnetic flux for the same foot-print area. In a stacked structure one coil in the pair may generally overly the other, but this need not necessarily be exact and there may be a small offset. It should also be noted that a stacked structure can be extended to more than two coils.

In order for the charging pad to charge a wide range of portable electronic loads, a methodology is proposed that involves the combined use of several basic principles and technical features. In the following description, the primary energy-transmitting windings in the charging pad will be called "transmitter windings" and the secondary energy-receiving windings inside the electronic loads will be called "receiver windings".

In embodiments of this invention, (i) the receiver winding are larger than the transmitter windings, (ii) the receiver winding should fully cover at least one transmitter winding wherever the electronic load that contains the receiver winding is placed on the charging surface of the charging pad and (iii) one transmitter winding is sufficient to provide enough power transfer for the electronic load under consideration for the charging pad. As discussed above a multilayer structure of stacked windings can be used to enhance the magnetic flux for the same foot-print area. Preferably the area ratio of the receiver winding and one transmitter winding must be minimized provided that condition (ii) is satisfied.

The basic concept of the localized charging principle is to energize only the relevant transmitter windings that are directly underneath the receiving windings of the electronic loads for energy transfer. In other words, the localized charging principle is load-position dependent. It only energizes the areas on the charging surface where the electronic loads are placed. In preferred embodiments of this invention, it is proposed to energize only one transmitter winding for each electronic load or at least only those covered by the electronic load. This offers the following advantages:

(a) Since the transmitter winding is fully covered by the receiver winding (with electromagnetic shielding that should extend at least for the same dimensions as the receiver winding and preferably should extend beyond the receiver winding), this avoids unnecessary electromagnetic radiation from the charging surface that is not covered by the electronic load. This reduces the generation of possible electromagnetic interference (EMI).

(b) Unnecessary switching and conduction power losses are avoided or at least mitigated in transmitter windings that play no part in energy transfer. This improves the overall energy efficiency of the entire charging system.

(c) The possibility of human exposure to the transmitted energy from the charging pad due to physical contacts on the charging surface of the charging pad is either eliminated or at least reduced. This feature helps meeting the "IEEE C95.1 standard for safety levels with respect to human exposure to radio frequency electromagnetic fields, 3 kHz to 300 GHz."

In order to select the appropriate transmitter windings for localized charging, suitable power inverter circuits are required that can connect and energize the selected transmitter windings to excite these selected windings at the appropriate frequency so as to maximize the magnetic coupling and energy transfer between the transmitter windings of the charging pads and the receiver windings of the electronic loads. The electronic switching circuit should periodically check the existence of the loads on the charging pad. Once the load compatibility has been favorably checked, the power electronic switching circuit should energize appropriate transmitter winding for energy transfer.

Embodiments of the present invention include the use of a bi-directional communication system for detecting the presence and location of load(s) on the surface of the charging pad. The communication system must check the identity and compatibility of the loads so that items not designed or intended to be charged on the charging pad will not receive transmitted power. This feature ensures the safety of the users. For example, should a cigarette lighter be accidentally placed on the charging pad it must not receive any power from the charging pad. In addition, the bi-directional communication should provide information for the battery charge condition. When the loads are fully charged, the selected transmitter windings should stop energy transfer in order to reduce unnecessary energy wastage.

In the following description, these integrated technical aspects will be explained in more detail.

Figure 4:
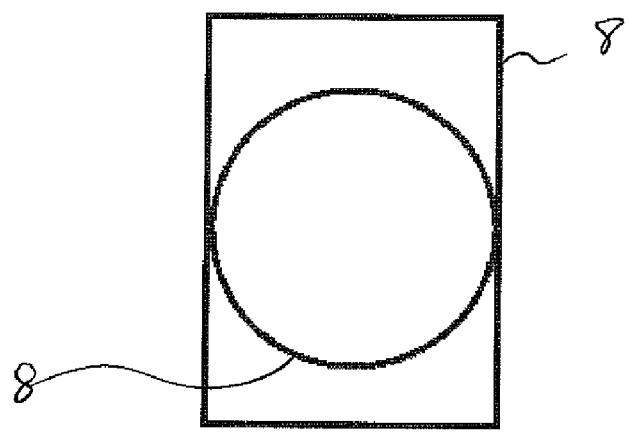
FIG. 4 shows examples of rectangular or circular receiver windings.

The three conditions proposed for the windings are that (i) the receiver winding 8 should be larger than the transmitter windings 7 in the sense that the receiver winding 8 should enclose a greater area than a transmitter winding 7, (ii) the receiver winding 8 must fully cover at least one transmitter winding 7 wherever the electronic load is placed on the charging surface of the charging pad and (iii) one transmitter winding 7 is sufficient to provide enough power transfer to charge the battery of an electronic device intended to be chargeable on the charging pad. In this example, it is assumed that the receiver winding 8 is circular. However, the skilled reader will understand that the receiver winding 8 can be of other shapes such as any polygonal shape such as a rectangular shape, or it may be an oval shape as illustrated in FIG. 4. FIG. 4 shows typical examples of receiver windings of rectangular and circular shape. The receiver winding is embedded inside the electronic device (or at least with a battery if the battery is to be charged separately from the device) for mutual coupling with the transmitter winding. In other words, the transmitter winding is equivalent to the primary winding of a transformer and the receiver winding is equivalent to the secondary winding.

Figure 5:
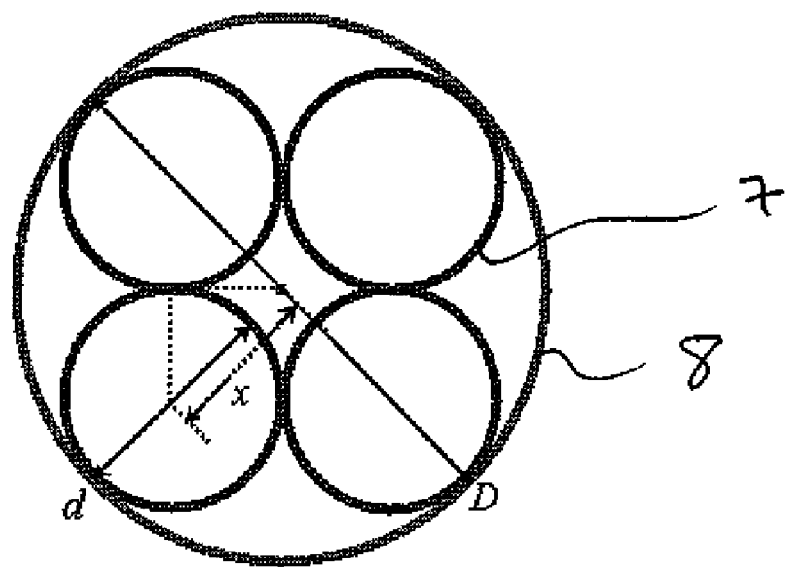
FIG. 5 illustrates the dimensional relationship between large receiver windings and smaller transmitter windings based on a square packing of circular windings.

FIG. 5 shows the use of circular spiral primary windings 7 arranged in a square packing manner. The diameter of each transmitter winding 7 is d and that of the corresponding circular receiver winding 8 is D. The arrangement shown in FIG. 5 is such that even with a slight movement of the large receiver winding 8 in any direction, the receiver winding 8 will always enclose or cover at least one of the smaller transmitter windings 7. It will be understood that while FIG. 5 only shows four transmitter windings 7 in practice these four windings are only a small part of a larger regular array of similar windings.

As shown in FIG. 5, x has the relationship with d, as given by equation (1):

$$x = \sqrt{2} \cdot \frac{d}{2} \quad (1)$$

Then the diameter of the receiver winding, D, can be expressed by (2):

$$D = \frac{d}{2} + x + x + \frac{d}{2} = (1 + \sqrt{2})d \quad (2)$$

The area ratio between one receiver and transmitter windings is:

$$\frac{A_{receiver}}{A_{transmitter}} = \frac{\pi(D/2)^2}{\pi(d/2)^2} = \frac{D^2}{d^2} = (1 + \sqrt{2})^2 \approx 5.8284 \quad (3)$$

Figure 6:
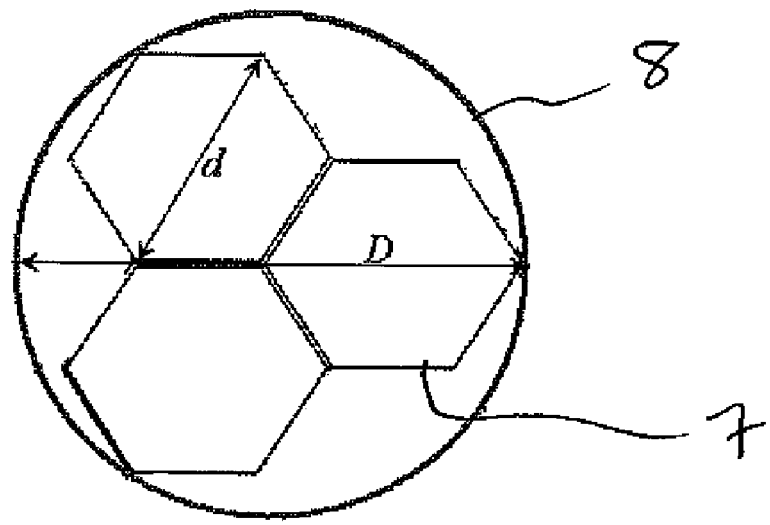
FIG. 6 illustrates the dimensional relationship between large receiver windings and smaller transmitter windings based on hexagonal packing of hexagonal spiral windings.

Using the same argument, other transmitter windings of other shapes and packing methods can be used. For example, FIG. 6 shows the hexagonal packing of hexagonal spiral transmitter windings 7 and an overlying circular receiver winding 8. Again, in the event of any slight movement of the larger receiver winding 8 in any direction at least one transmitter winding 7 is still enclosed by the receiver winding. Again, as with FIG. 5 it will be understood that while FIG. 6 only shows three transmitter windings, in practice these windings are only part of a larger regular array of like windings.

In this example the relationship between D and d is:

$$D = 2d \quad (4)$$

The area ratio between one receiver and transmitter winding is:

$$\frac{A_{receiver}}{A_{transmitter}} = \frac{\pi \frac{D^2}{4}}{3 \cdot \frac{d}{2} \cdot \frac{d}{2} \cdot \frac{\sqrt{3}}{2}} = \frac{2\pi}{3\sqrt{3}}\left(\frac{D}{d}\right)^2 \approx 4.8368 \quad (5)$$

The area ratio is an important factor in the optimal transmitter and receiver winding coverage theory. This ratio should be minimized subject to the conditions that the receiver winding is larger than a transmitter winding (i.e., the ratio can never be 1 or less) and that wherever the receiver winding is placed on the charging surface at least one transmitter winding is always fully covered. From equations (3) and (5), it is clear that winding arrangement in FIG. 6 is preferable to that in FIG. 5 because it has a lower area ratio.

Figure 7:
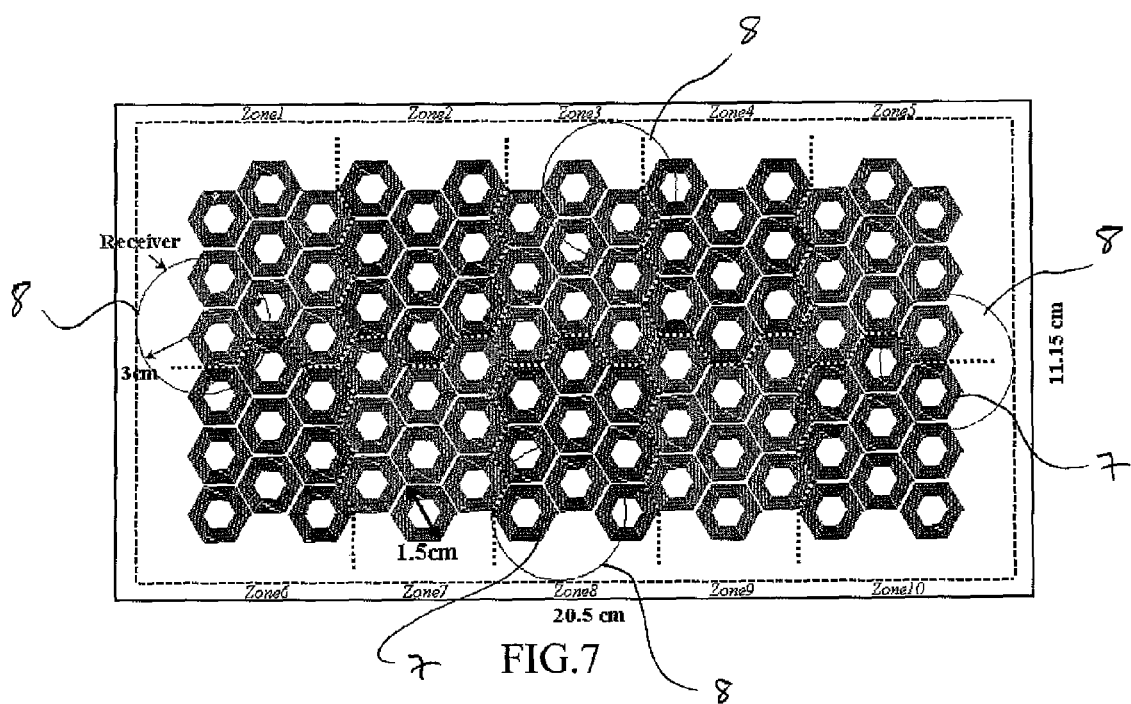
FIG. 7 illustrates an example of load-dependent selection of transmitter windings for energization.

The load-dependent selection of the transmitter windings is illustrated with the aid of FIG. 7 which shows four electronic loads (illustrated by circular receiver windings 8) are placed on an array of hexagonal transmitter windings 7. Surrounding the transmitter windings 7 is a peripheral area in which no transmitter windings are provided, but provided that a receiver winding of each load does not extend beyond this peripheral area a receiver winding 8 will fully cover at least one transmitter winding 7. If the receiver winding 8 does extend beyond the peripheral area it may be considered to be not properly placed on the charging platform.

If the receiver winding 8 covers more than one transmitter winding 7, as may often occur, then if one transmitter winding 7 provides enough power transfer for the electronic load under consideration, it is only necessary to excite one transmitter winding 7. In order to select the transmitter winding(s) 7 to be energized, each transmitter winding 7 can be periodically energized for a short time at low power. If there is a receiver winding 8 enclosing a transmitter winding 7, the impedance of the transmitter winding 7 will be changed and can be detected indicating the presence of a load. However, load detection alone is not the only condition for determining the selection of the transmitter windings for energy transfer. Load identification and compatibility check are also needed and will be discussed further below. Furthermore if two transmitter windings 7 are found to be covered by a single receiver winding 8, a choice may be made as to which of the transmitter windings is to be energized based for example upon which of the transmitter windings 7 couples the most strongly to the receiver winding 8.

In order to selectively energies the appropriate transmitter windings 7 to charge a load, several matrix power switching circuits are proposed and illustrated by way of example in the context of the winding array structure in FIG. 7. In general, the transmitter windings can be grouped into zones with the number of zones and the number of transmitter windings within each zone depending on the dimensions of the charging surface of the charging pad and the transmitter windings. In FIG. 7, the transmitter windings are grouped into ten zones and each zone has nine transmitter windings. Another advantage of the zone approach is that the winding structure as well as the electronics (power switches, controller, etc.) in one zone is scalable and duplicable.

Figure 8:
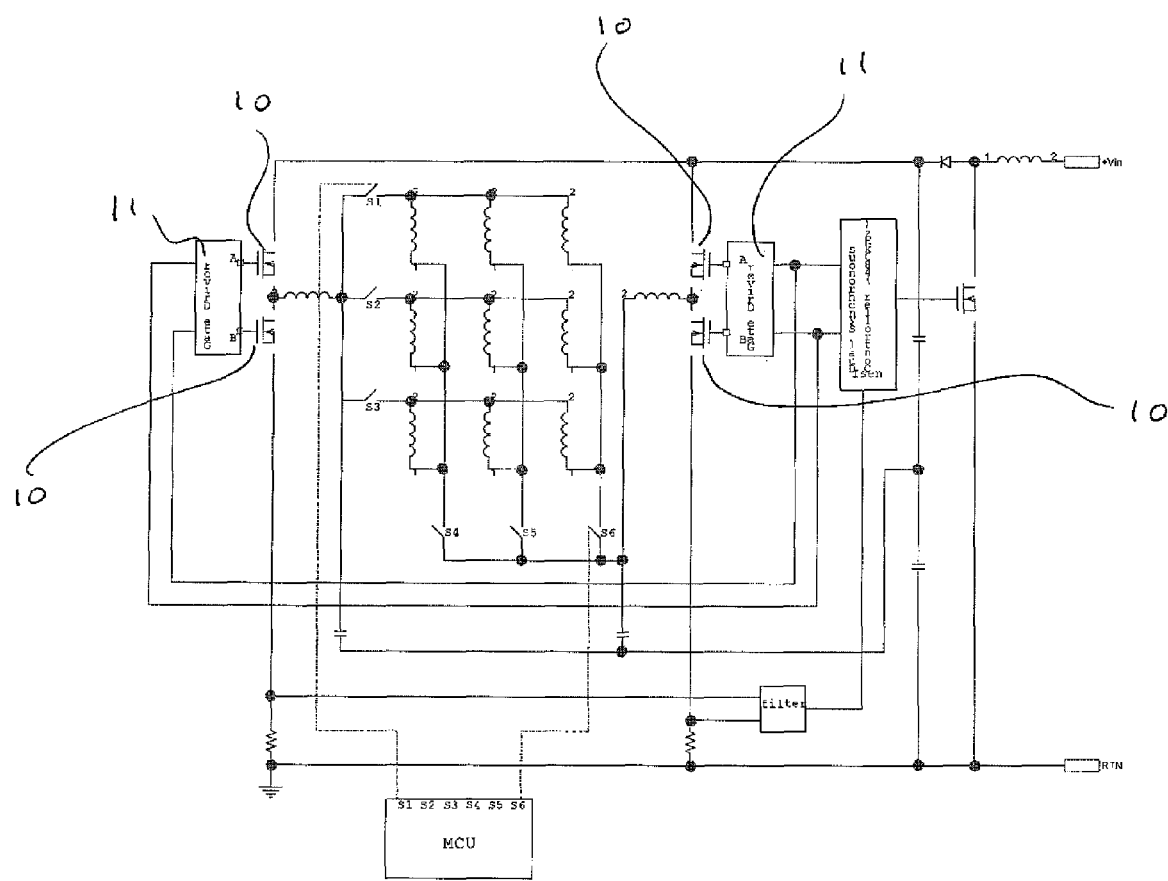
FIG. 8 shows one example of a switching circuit for transmitter winding selection and excitation.

FIG. 8 shows one embodiment of a matrix power electronic switching circuit for selecting and energizing the appropriate transmitter windings in a winding zone. The dc link voltage is provided by a boost converter in this example. The matrix power switching circuit comprises a power inverter consisting of four high-frequency power switches 10 that in FIG. 8 are implemented by power mosfets driven by gate drivers 11 and that are switched to provide high-frequency excitation for the selected transmitter windings. The winding selection is made by closing the appropriate row-switches S1, S2, S3 and column-switches S4, S5, S6. S1 to S6 are bi-directional switches that do not need high-frequency switching. If chosen, they will be turned on during the charging period. For example, if the transmitter winding in the middle of the zone is selected, row-switch S2 and column-switch S5 will be turned on during the charging period. Similarly, the top right-hand winding can be selected by closing S1 and S6.

Figure 9:
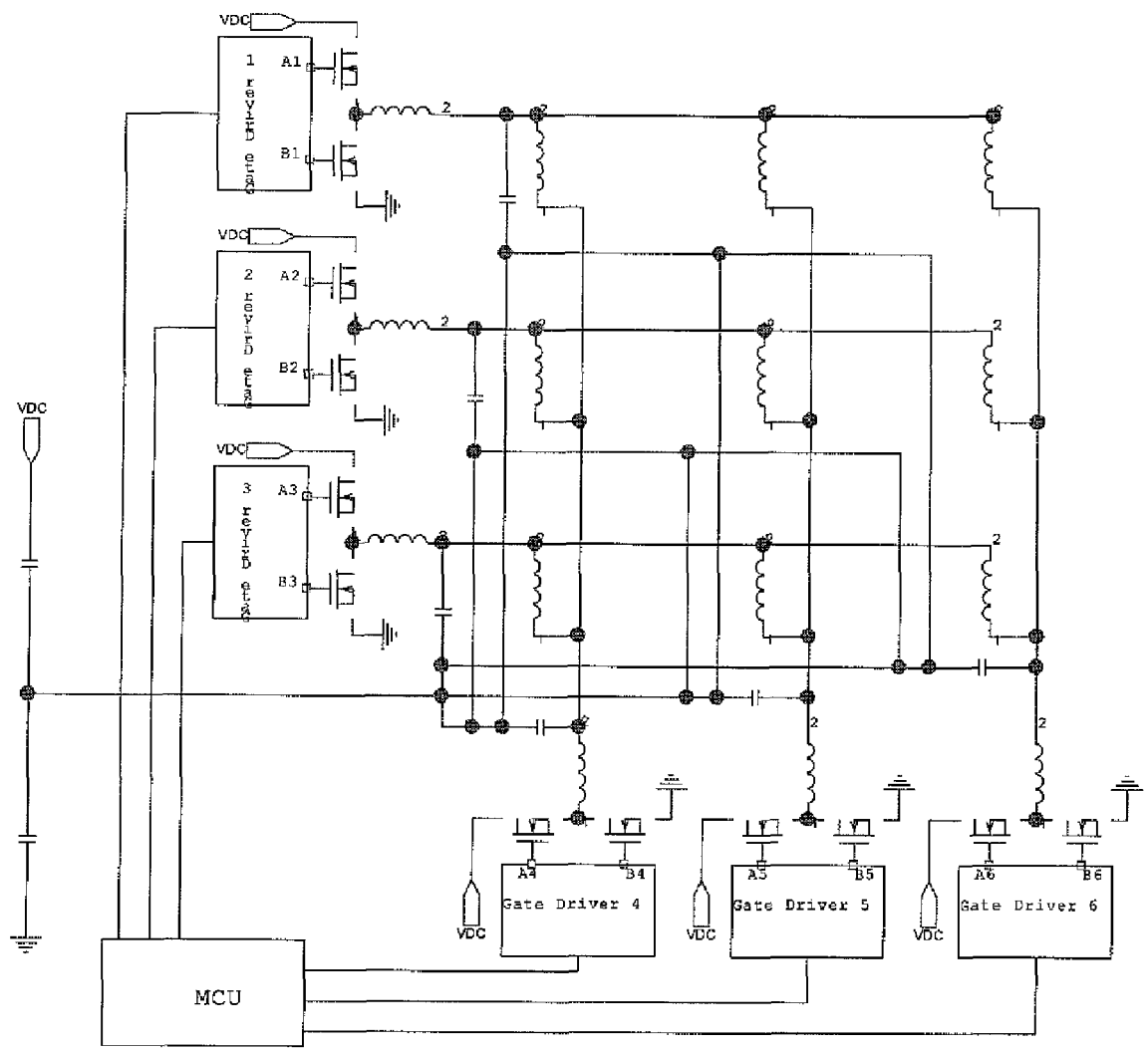
FIG. 9 shows another example of a switching circuit for transmitter winding selection and excitation.

FIG. 9 shows a second example for this winding selection and excitation principle. This consists of three row-inverter legs (each consisting of a totem-pole switching pair) and three column-inverter legs. For example, in order to select the middle winding for excitation, the middle row-inverter and the middle column-inverter can be switched to generate ac power excitation.

In both the circuits of FIG. 8 and FIG. 9 filter means are provided to ensure high-quality sinusoidal voltage and current waveforms, and in each circuit the operation of the switches is controlled by a microprocessor MCU.

Bi-directional communication (including a handshaking method) between the charging pad and the electronic loads has to be established for load identification, compatibility check and battery charge monitoring. The charging pad should only charge the loads if they are compatible with the charging pad. For example, a cigarette lighter should not be charged even though its presence is detected. The choice of communication methods can be selected from at least, but not restricted to, amplitude modulation, frequency modulation, ASK, FSK, NFC/RFID etc.

The handshaking method can be implemented with various forms of communication codes and protocols. In the following description, one such method is illustrated.

Figure 10:
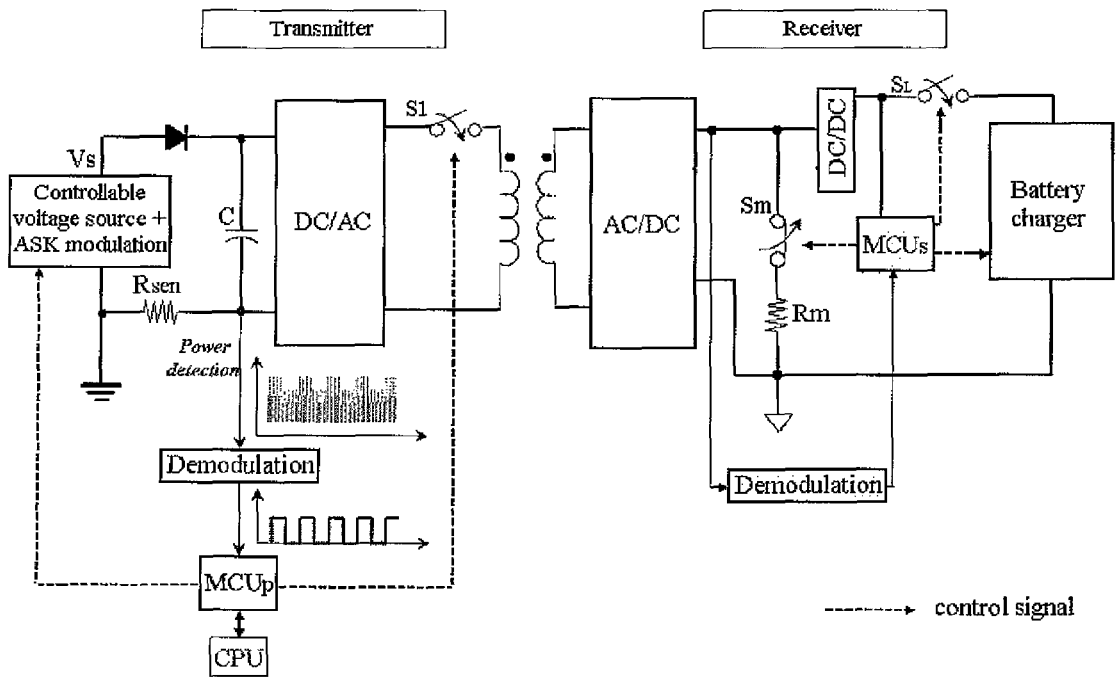
FIG. 10 illustrates an example of a method of bi-directional communication between the transmitter windings and the receiver winding.

The basic implementation of bi-directional communication by using amplitude modulation is shown in FIG. 10. Data can be transferred in both directions, i.e., from the receiver to the transmitter, and from the transmitter to the receiver.

Figure 11:
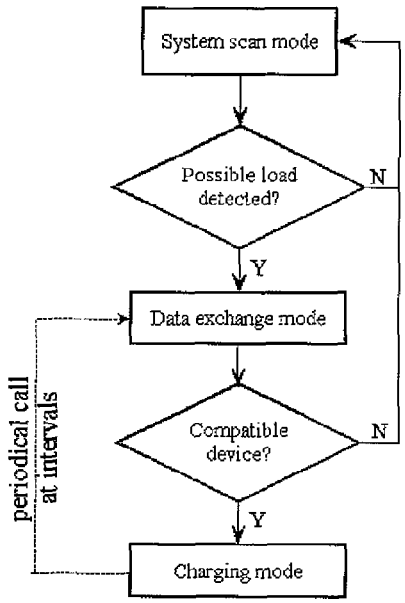
FIG. 11 is a flow diagram for the operation of one example of the invention.

To transmit data from the receiver to the transmitter, the micro-controller at the receiver side (MCUs) controls a switch $S_m$ to change the loading conditions in order to achieve transferred power modulation by connecting or disconnecting resistor $R_m$ which can be detected by a sensing resistor $R_{sen}$ at the transmitter side. After demodulation at the transmitter side, the data is then forwarded to the transmitter controller (MCUp) and a central processing unit (CPU). The operation flowchart of the system is given in FIG. 11 and the details of each mode is explained as follows:

In a system scan mode the CPU instructs each zone to check periodically the loading condition by exciting each transmitter winding for a very short time at a low AC power level (i.e., much lower than the normal charging power level). The loading condition of each winding will be detected. During this scanning mode, MCUs is not activated at all. The transferred power is only consumed by a large resistor $R_m$, and is much smaller than the typical charging power absorbed by a battery. Such transferred power is then detected by $R_{sen}$ at the transmitter side. When the detected power is higher than the low threshold value and below the over-power limits, the load is identified as a possible load. The position of the load can also be known by searching for a local maximum amongst different transmitter windings. When no load or an invalid load is detected, the system will loop back and repeat the system scan. The use of very low power in this scanning process is also for safety reasons and prevents the inverter circuit from facing a short-circuit or near-short-circuit situation, particularly when the load is a piece of metal or cigarette lighter.

In the data exchange mode, the local maximum and the nearest coil is identified in the previous system scan mode will perform a scanning for compatible devices. The coil is then excited for a relatively longer time than the initial system scanning process at low AC power level. If the detected load is a compatible device, the awake MCUs in a compatible receiver will transfer data including handshaking data according to the protocol by controlling $S_m$ for power modulation. If no compatible data can be received at transmitter side, the system goes back to system scan mode.

When a compatible device is found and the best transmitter winding position (based on maximum power information in the two scanning processes) is selected, the power inverter of that zone will excite and energize the selected winding at full power (by increasing $V_s$ as shown in FIG. 10) and at a specified frequency. The receiver will be in the charging operating state in which $S_L$ is closed so as to transfer power to the battery. MCUs can also include the function of controlling the battery charger. During the battery charging, as an option the receiver MCUs periodically sends back the instant information according to the protocol by controlling $S_m$. If data communication breaks, or too much data error occurs over a specified time period, or information of 'fully-charged' is received, or abnormal conditions are sent, the charging mode will exit and go back to system scan mode for periodical scanning.

As shown in FIG. 10, the voltage source, $V_s$, can be controlled by MCUp. The modulated power by using ASK (amplitude shift key) can be transferred to the receiver and demodulated by the demodulator at receiver side. The demodulated data are then forwarded to MCUs.

The above bi-directional communication can be performed by each charging zone independently of each other.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A planar battery charging system, comprising:
   a primary power transmission side formed of an array of primary windings adapted to generate magnetic flux substantially perpendicular to a charging surface; and
   a secondary power receiving side comprising a secondary winding associated with a battery to be charged and being adapted to receive said magnetic flux when placed on said charging surface, said secondary winding being provided with electromagnetic shielding on the side of said winding opposite from the side to be placed on the charging surface;
   wherein the relative dimensions of the primary windings and the secondary winding are chosen to meet the conditions that (a) the area enclosed by the secondary winding is greater than the area enclosed by a primary winding, (b) the secondary winding or said shielding will always fully enclose a primary winding when a secondary winding is placed on said charging surface, and (c) a single primary winding generates sufficient power to charge a said battery.

2. The planar battery charging system as claimed in claim 1, wherein the ratio of the area enclosed by the secondary winding to the area enclosed by a primary winding is minimized while being consistent with conditions (a) and (b).

3. The planar battery charging system as claimed in claim 1, wherein said primary windings are arranged in a regular array of identical size and shape.

4. The planar battery charging system as claimed in claim 1, wherein said array of primary windings is divided into a plurality of zones and wherein within each zone said primary windings are of identical size and shape.

5. The planar battery charging system as claimed in claim 1, wherein said primary windings are provided in a stacked structure.

6. The planar battery charging system as claimed in claim 5, wherein a primary winding is formed of two or more connected coils separated by a substrate.

7. The planar battery charging system as claimed in claim 1, wherein only a single primary winding is excited when a secondary winding is placed on said charging surface.

8. The planar battery charging system as claimed in claim 1, wherein said electromagnetic shielding extends beyond the dimensions of the secondary winding.

9. The planar battery charging system as claimed in claim 1, wherein only a primary winding that is covered when a secondary winding is placed on said charging surface is excited.

10. A planar battery charging system, comprising:
a primary power transmission side formed of an array of primary windings adapted to generate magnetic flux substantially perpendicular to a charging surface; and
a secondary power receiving side comprising a secondary winding associated with a battery to be charged and being adapted to receive said magnetic flux when placed on said charging surface, wherein when a said secondary winding is placed on said charging surface only a single primary winding is excited to generate magnetic flux to charge said battery.

11. The planar battery charging system as claimed in claim 10, further comprising a matrix switching array for enabling a selected primary winding to be excited.

12. The planar battery charging system as claimed in claim 10, wherein when excited a single primary winding provides sufficient magnetic flux to charge a said battery.

13. The planar battery charging system as claimed in claim 10, further comprising means to detect the presence and location on said charging surface of a said secondary winding.

14. A planar battery charging system, comprising:
a primary power transmission side formed of an array of primary windings adapted to generate magnetic flux substantially perpendicular to a charging surface;
a secondary power receiving side comprising a secondary winding associated with a battery to be charged and being adapted to receive said magnetic flux when placed on said charging surface; and
a matrix switching array for selectively exciting individual primary windings.

15. The planar battery charging system as claimed in claim 14, wherein said array of primary windings comprises a plurality of rows and a plurality of columns, wherein said matrix switching array comprises one switch per row and one switch per column, and wherein a winding to be excited is selected by closing the switches in the row and column corresponding to the location of the winding.

16. The planar battery charging system as claimed in claim 15, wherein said switches are controlled by a microprocessor control unit.

17. The planar battery charging system as claimed in claim 14, wherein said matrix switching array includes filter means.

18. A planar battery charging system, comprising:
a primary power transmission side formed of an array of primary windings adapted to generate magnetic flux substantially perpendicular to a charging surface;
a secondary power receiving side comprising a secondary winding associated with a battery to be charged and being adapted to receive said magnetic flux when placed on said charging surface; and
data communication means for enabling data communication between the primary side and the secondary side.

19. The planar battery charging system as claimed in claim 18, wherein data transfer from said primary side to said secondary side is achieved by modulating the excitation of a primary winding.

20. The planar battery charging system as claimed in claim 18, wherein data transfer from said secondary side to said primary side is achieved by modulating a parameter on said secondary side.

21. The planar battery charging system as claimed in claim 20, wherein data transfer from said secondary side to said primary side is achieved by changing the loading conditions.

22. The planar battery charging system as claimed in claim 18, wherein said data communication comprises detection by said primary side of a load to be charged on said secondary side.

23. The planar battery charging system as claimed in claim 21, wherein the detection of a load to be charged includes the detection of the location of said load on said charging surface.

24. The planar battery charging system as claimed in claim 18, wherein said data communication comprises hand-shaking and compatibility checks between said primary side and a load to be charged.

25. The planar battery charging system as claimed in claim 18, wherein said data communication comprises determination of the charging status of a battery.

* * * * *